United States Patent [19]
Takasaki et al.

[11] Patent Number: 5,530,947
[45] Date of Patent: Jun. 25, 1996

[54] GRAPHICS PROCESSING SYSTEM HAVING FUNCTION FOR OPERATING AND EDITING DATA OF A VECTOR GRAPHIC AND DATA OF AN IMAGE

[75] Inventors: Naruto Takasaki; Yutaka Tanaka, both of Yokohama; Go Nakanishi, Tokyo, all of Japan

[73] Assignee: Hitachi Software Engineering Co., Ltd., Kanagawa-ken, Japan

[21] Appl. No.: 960,855

[22] Filed: Oct. 14, 1992

[30] Foreign Application Priority Data

Oct. 14, 1991 [JP] Japan ................ 3-291918

[51] Int. Cl.$^6$ ................ G06F 17/50
[52] U.S. Cl. ................ 395/161; 395/135
[58] Field of Search ................ 395/135, 141, 395/143, 146, 147, 155, 161; 345/113, 115, 135

[56] References Cited

U.S. PATENT DOCUMENTS

| | | | |
|---|---|---|---|
| 4,491,836 | 1/1985 | Collmeyer et al. | 345/135 |
| 5,070,534 | 12/1991 | Lascelles et al. | 395/155 |
| 5,138,697 | 8/1992 | Yamamoto et al. | 395/141 X |
| 5,265,197 | 11/1993 | Kondo | 395/161 X |
| 5,278,950 | 1/1994 | Takei et al. | 395/161 X |
| 5,293,471 | 3/1994 | Ikeuchi | 395/143 |

OTHER PUBLICATIONS

"Vector and Raster Hidden–Surface Removal Using Parallel Connected Stripes", *IEEE Computer Graphics and Applications*, vol. 7, No. 7, Jul. 1987.

"Vector Versus Raster: A Functional Comparison of Drawing Technologies", *IEEE Computer Graphics and Applications*, vol. 10,, No. 5, Sep. 1990, pp. 68–80.

*Primary Examiner*—Raymond J. Bayerl
*Assistant Examiner*—Crescella N. dela Torre
*Attorney, Agent, or Firm*—Fay, Sharpe, Beall, Fagan, Minnich & McKee

[57] ABSTRACT

A graphics processing system has an image memory for storing data of an image, a data memory for storing data of a vector graphic, a display unit for displaying the data of the image and the data of the vector graphic, an input device for providing an instruction to edit the vector graphic and the image, and a library in which a command having a function for processing including an operation of the vector graphic and a command having a function for processing including an operation of the image are registered; in which the data of the image and the data of the vector graphic are displayed in a superimposed way, operated, and edited, and wherein a series of the processing for operating and editing the data of the vector graphic and the data of the image is performed through the command of the library.

5 Claims, 9 Drawing Sheets

```
INPUT "STARTING POINT?", SP
INPUT "HEIGHT?", HEIGHT
CALL TRACE(1, SP,)
CALL FIGATT(5, "CONT", HEIGHT)
```

NAME OF COMMAND: RREVRSE

PARAMETERS: LOWER LEFT POINT, UPPER RIGHT POINT

FUNCTION : Reverse white & black colors of an image into black & white colors, respectively, in a region specified by two points on the image drawing connected to a vector drawing currently loaded.

NAME OF COMMAND: FIG2RAS

PARAMETERS: POLYGON

FUNCTION : When data on a vector graphic on a vector drawing currently loaded is specified, the image data is drawn along the data.

| NAME OF COMMAND: PRLSNAP |
|---|
| PARAMETERS: POINT 1, POINT 2, POINT 3, ···, POINT n |
| FUNCTION : The polygons, prepared by snapshotting sequence of input points as points on linear image on image drawing, are drawn on vector drawing. |

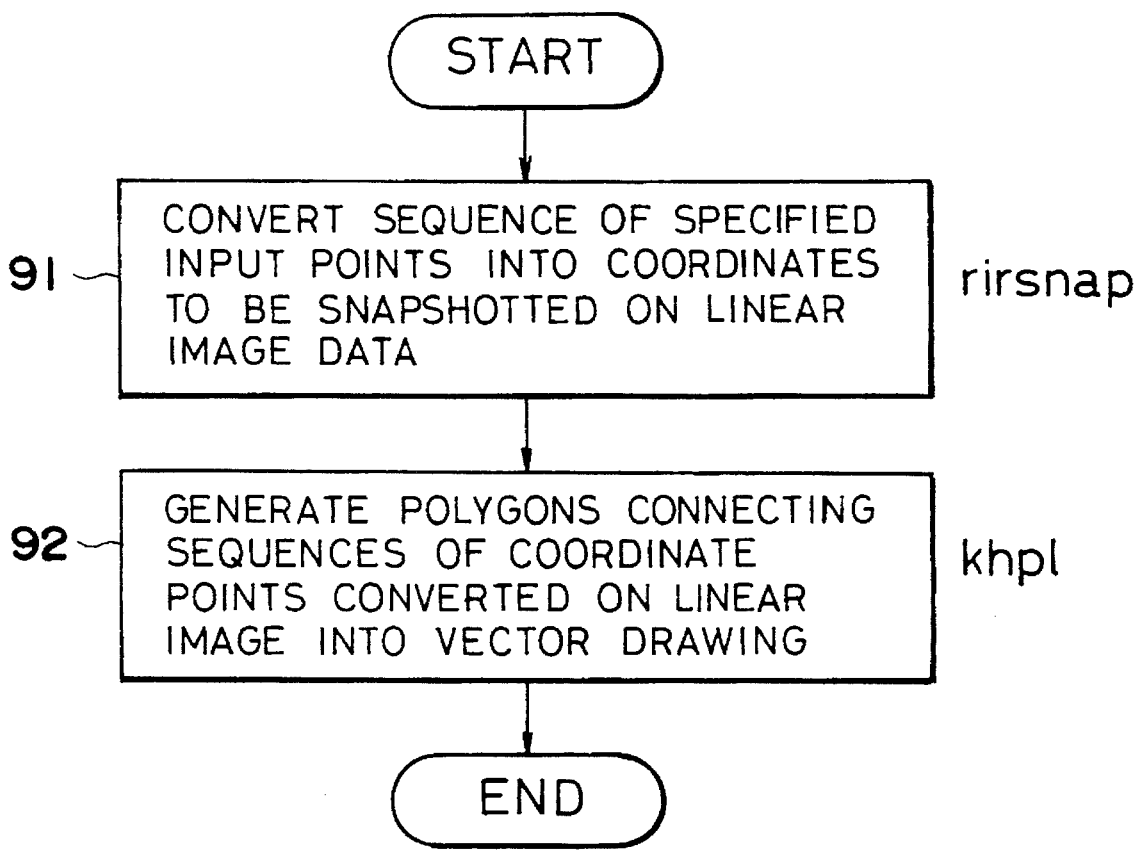

GRAPHICS PROCESSING SYSTEM HAVING FUNCTION FOR OPERATING AND EDITING DATA OF A VECTOR GRAPHIC AND DATA OF AN IMAGE

BACKGROUND OF THE INVENTION

The present invention relates to a graphics processing system capable of processing both graphics and images and, more particularly, to a graphics processing system with a library in which a command having a function of operating and editing data of a vector graphic and data of an image is registered and a command capable of being employed independently with a system by a user is registerable.

For instance, when a drawing is processed with a computer-aided design unit (CAD), it is common that pictures, such as a map, on paper are read with a scanner or the like and digitized, followed by managing them as data of the vector graphic. Further, when a document is to be prepared, an illustration may be read with a scanner and entered into text data of the document as data of the image. Although the data of the vector graphic and the data of the image are frequently operated and edited, they have heretofore been processed separately in many occasions. In addition, each of the data of the vector graphic and the data of the image has been required to satisfy the function suitable for each operation because the way of using the data may vary with operations.

Heretofore, users have attempted to adapt the functions to their own operations within the system by combining a system for processing vector graphics and a system for processing data of the image as sub-systems within the system, or by forming a command for exclusive use with the users by taking advantage of an existing graphic user interface.

Those conventional techniques as described hereinabove, however, present the following problems in forming a command that allows the user to treat both the data of the vector graphic and the data of the image.

1. When a system for treating a vector drawing is combined with a system for treating an image drawing, the two systems are employed in combination so that the limitation is placed upon the function and the way of input and output into and from drawing files and the like is restricted.

2. When the existing graphic user interface is used, it is difficult to operate and edit the data of the vector graphic and the data of the image with high freedom so as to be suited for a user's own operation, although the data of the vector graphic and the data of the image can be displayed with ease. Further, the user is required for an increased work load for programming in order to prepare a command having such a function.

3. Although the necessity of using the vector drawing in association with the image drawing is high on business, the processing for treating both of the vector drawing and the image drawing is not easy because there is no graphic user interface capable of treating both of the vector drawing and the image drawing simultaneously in association with each other.

SUMMARY OF THE INVENTION

Therefore, it is an object of the present invention to solve the problems inherent in the conventional techniques and systems and to provide a graphics processing system with a library in which a command having a function of operating and editing data of a vector graphic and data of an image is registered and a command capable of being independently employed with a system by a user is capable of being registered.

In order to achieve the aforesaid object, the present invention consists of a graphics processing system having an image memory for storing data of an image, a data memory for storing data of a vector graphic, a display unit capable of displaying both of the data of the image and the data of the vector graphic, and an input device for giving an instruction to edit the vector graphic and the image disposed so as to display the data of the image and the data of the vector graphic in a superimposed manner, operate them, and edit them, which is characterized by a library in which a command having the processing function for each of the operations of the vector drawing and the images, wherein the processing function for the operation of the image is registered, wherein a series of the operations and the editing of the data of the vector graphic and the data of the image is implemented through each of the commands of the library. Further, the graphics processing system of the present invention is characterized by a high-level language interface library capable of operating and editing both of the data of the vector graphic and the data of the image, thereby capable of easily preparing a command for treating both of the data of the vector graphic and the data of the image simultaneously.

The graphics processing system according to the present invention is arranged so as to treat both of the vector graphic and the image, so that it has the image memory for storing the data of the image, the data memory for storing the data of the vector graphic, the display unit capable of displaying both of the data of the image and the data of the vector graphic, and the input device for giving the instruction to edit the vector graphic and the image, thereby capable of implementing the processing for displaying the data of the image and the data of the vector graphic in a superimposed manner, operating them, and editing them. Further, the graphics processing system according to the present invention is provided with the library in which the commands for the processing function of operating the vector drawing and for the processing function of operating the image are registered, so that the processing for a series of the operations and editing of the data of the vector graphic and the data of the image can be implemented through the commands of the library.

Since the graphics processing system according to the present invention has the library with the commands registered therein so as to operate and edit either one of the data of the vector graphic and the data of the image, it can treat both of the data of the vector graphic and the data of the image simultaneously. By combining the commands having those functions as described hereinabove and registering them in the library as user's own commands, both of the data of the vector graphic and the data of the image can be operated with ease.

The library equipped in the graphics processing system according to the present invention has a command library having the function capable of operating image drawing files as well as vector drawing files, a macro language library, a high-level language interface library, and the like, thereby capable of operating and editing the vector drawing and the image drawing. Further, the user can prepare its own command suitable for its own operation capable of operating and editing both of the vector drawing and the image drawing.

Other objects, features and advantages of the present invention will become apparent in the course of the description of the preferred embodiments, which follows, with reference to the accompanying drawings.

BRIEF DESCRIPTION OF THE DRAWINGS

FIG. 9 is a flowchart showing an example of the processing flow through the command PRLSNAP.

DESCRIPTION OF THE PREFERRED EMBODIMENTS

The present invention will now be described more in detail by way of examples with reference to the accompanying drawings.

Figure 1:
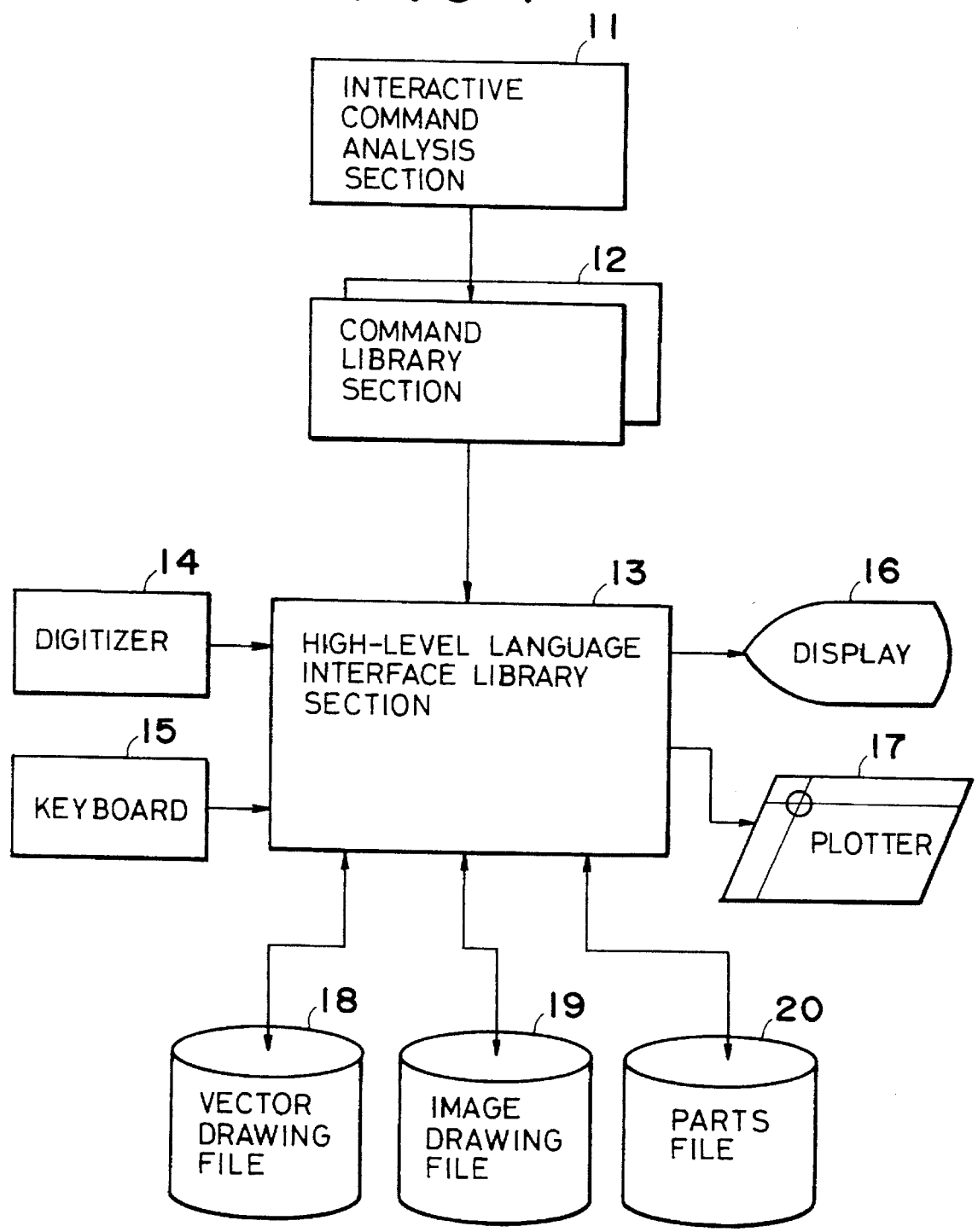
FIG. 1 is a block diagram showing the configuration of an essential portion of an interactive CAD system according to an embodiment of the present invention.

FIG. 1 is a block diagram showing the structure of the essential portion of the interactive CAD system according to an embodiment of the present invention, and the system structure as indicated in FIG. 1 indicates the relationship of system structuring elements for operating the commands having the function of editing both of the data of the vector graphic and the data of the image through a library for operating both of graphics and images. As shown in FIG. 1, reference numeral 11 stands for an interactive command analysis section, reference numeral 12 for a command library section, and reference numeral 13 for a high-level language interface library section. The structure of the interactive CAD system is of a hierarchical structure composed basically of three system elements. More specifically, the interactive CAD system is of a system configuration in which the system elements composed of the interactive command analysis section 11, the command library section 12, and the high-level language interface library section 13 are of a hierarchical structure. The interactive command analysis section 11 is so adapted as to analyze inputs of names of commands, parameters, and the like, and to control the execution of the commands. The command library section 12 is an executing module independently from each other and it is so adapted as to register the basic commands. The processing for the operation and the editing of the data of the vector graphic and the data of the image is implemented by starting the executing module of each of the commands of the command library section 12 through the interactive command analysis section 11. The high-level language interface library section 13 is a high-level language interface library having the function for operating each of the data of the vector graphic and the data of the image, and it is also adapted so as to implement the processing for controlling various peripheral devices and files to be employed for the CAD system.

Turning again to FIG. 1, reference numeral 14 stands for a digitizer, reference numeral 15 for a keyboard, reference numeral 16 for a display, reference numeral 17 for a plotter as an output device, reference numeral 18 for a vector drawing file, reference numeral 19 for an image drawing file, and reference numeral 20 for a parts file. The user enters the name of a command and data of a sequence of characters from the keyboard 15, and an instruction on a graphic is given or coordinates are entered from the digitizer 14. The data entered by the user is then processed by the command executing section 12 in accordance with the processing contents programmed in advance, and the vector graphic processed is stored in the vector drawing file 18, while the data of the image is stored in the image drawing file 19 and parts are edited and stored in the parts file 20. Further, the vector graphic and the contents of the image drawing file can be printed out on paper through the plotter 17.

Then, a description will be made of the various functions of the library built in the system, such as the function of the basic command library, the function of the macro language library, and the function of the high-level language interface library, as well as each of the commands prepared by making use of a macro language library through the system.

1. As the functions of the basic command library, there are provided, for example, the kinds of the commands as follows:

1a. Function of Displaying and Setting Various Information

The function may include, for example, the function of displaying information on the vector drawing; attributes of a current drawing such as a color, kind of a line, and the like, of the vector graphic; information on an image drawing specified; a list of widths of drawing an image, widths of erasing an image, etc.; and the like; and the function of setting each of them.

1b. Function of Operating and Editing Data of the Graphic

The function may include, for example, the function of drawing vector graphics such as a polygon, a circle (an arc), an oval (an elliptical portion), a curvature, a dimensional line, and the like, or the function of editing the selected graphic by deleting, stretching or moving.

1c. Function of Operating and Editing Data of the Image

The function may include, for example, the function of a penciling operation for drawing data of the image or an erasing operation for erasing the data of the image, or the function of editing data of the image by erasing it as a noise or by cutting, pasting or rotating it.

1d. Function of Tracing Data of the Image

The function may include, for example, the function of operating the conversion of a linear image into a polygonal graphic through tracing in an interactive way or the function of tracing the contour line of an image.

1e. Function of Operating Files

The function may include, for example, the function of loading or saving a vector drawing or an image drawing in a file, the function of assigning parts into a parts file, or the function of registering or calling a part in or from the parts file.

1f. Function of Displaying

The function of displaying may include, for example, the function of setting a window or a view port in a display screen and displaying a vector drawing and an image drawing in a superimposed manner.

1g. Function of Output to Plotter

The function may include, for example, the function of inquiring into or setting information on a plotter and printing part or a whole portion of the drawing through the plotter.

2. As the functions of the macro language library, there may be provided the kinds of the functions as follows:

2a. Function of Input and Output of Data

The function may include the function of entering input from the user and the function of displaying a message from the user.

2b. Function of Input and Output of Files

The function may include the function of opening, closing, reading and writing a text file.

2c. Command Control Statements

The function of controlling the commands involves the function for controlling a flow of the command processing, such as IF, FOR, WHILE, BREAK, etc.

2d. Function of Executing Command of Command Library

The function may include, for example, the function of executing a command through a CALL statement or the function of executing a sequence of commands in combination therewith.

2e. Function of Displaying and Setting Various Information

The function may include, for example, the function of inquiring information about and setting the vector drawing; attributes of a current drawing such as a color, kind of lines, and the like, of the vector graphic; and information on an image drawing specified.

2f. Operation Functions

The function may include, for example, the function of performing a logical operation or the function of computing the shape of a graphic, such as intersecting points, perpendicular points, and the like.

3. As the functions of the high-level language interface library, there may be provided the functions as follows:

3a. Function of Setting and Inquiring

The function may include, for example, the function of inquiring about and setting information on the vector drawing; attributes of a current drawing such as a color, kind of lines, and the like, of the vector graphic; information on an image drawing connected to the vector drawing specified; and a list of widths of drawing an image, widths of erasing an image, etc.

3b. Function of Editing Data

The function of editing data may include, for example, the function of editing data of the vector graphic and data of the image by drawing or deleting the vector drawing, drawing or deleting the image, and the like.

3c. Function of Operating Files

The function of operating files may include, for example, the function of loading or saving the data of the vector drawing and the data of the image drawing, and the function of assigning parts into the parts file or registering or calling a part into or from the parts file.

3d. Function of Input

The function of input may include, for example, the function of entering coordinates, characters, sheet menu, and the like, the function of snapshotting input points into vector or terminal points of an image.

3e. Function of Display

The function of display may include, for example, the function of setting a window or a view port and displaying a vector drawing and an image drawing in a superimposed way or the function of converting between coordinate values of a vector drawing system and coordinate values of an image drawing system.

3f. Function of Selecting Graphics

The function may include the function of selecting a vector graphic or the function of releasing the selection of the vector graphic.

3g. Function of Output to Plotter

The function of output to the plotter may include, for example, the function of inquiring about information on the plotter or the function of changing or moving a pen.

3h. Function of Setting Environment of System

The function may include, for example, the function of setting an environment of the system by setting information on a color of the system or an amount of memory to be handled in treating an image drawing with the system.

In the interactive CAD system according to the present invention, the user can readily prepare a command in the system, other than the command provided originally by the system, by providing the user with an environment similar to that provided for preparing a system command. Further, the processing for operating, editing, etc., the vector drawing and the image drawing can be implemented, while satisfying the same performance and functions as the command provided by the system.

Although each of the vector drawing and the image drawing is stored in a different drawing file, one sheet of the image drawing is so arranged as to be managed so as to be capable of being connected to one sheet of the vector drawing. In this system, when the user prepares its own command in combination of the functions of the library, the data of the image is operated by specifying a vector drawing and implementing the processing for operating and editing the image drawing connected to the vector drawing in substantially the same manner as the data of the vector graphic.

Then, a description will be made of an example of the command which is prepared by making use of the macro language library in the interactive CAD system. This example of the command is prepared by tracing a contour line specified on data of the image of a map, converting the contour line into data of the vector graphic of a polygonal graphic, and combining a sequence of instructions by making use of macro instructions registered in the macro language library as the processing function for adding information on the height to the data of the polygonal lines. The command prepared by coding is registered into the command library, for example, as the name of a command "CONTOUR".

Figure 2:
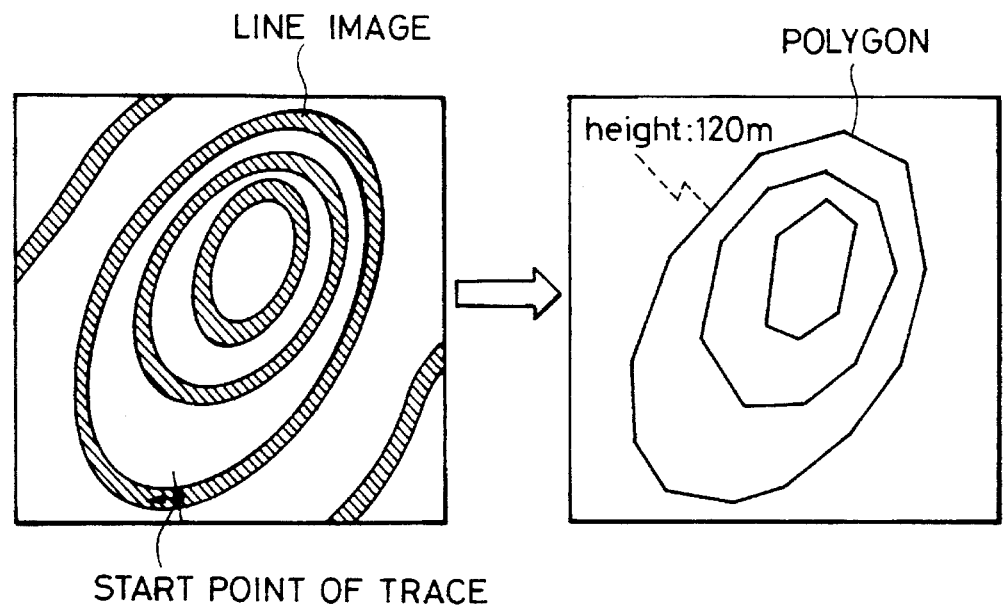
FIG. 2 is a diagram showing the processing function of a command CONTOUR.

FIG. 2 is a diagram for describing the processing function of the command CONTOUR, and FIG. 3 is a flowchart for describing an example of coding a sequence of macro instructions of the command CONTOUR by the macro language and a flow of the processing therefor. In the sequence of the macro instructions of the processing functions, the parameters are entered by the user through an INPUT statement, and the command of the command library is executed by a CALL statement. More specifically, the processing function of the command CONTOUR is performed by specifying the command CONTOUR as the name of the command and entering "starting point" and "height"

as the parameters, as shown in FIG. 2, whereby each of the contour lines on the image drawing currently loaded is traced and converted into polygonal lines to give data of polygonal lines and then data on an attribute of the "height" is added to the data of the polygonal lines.

Figures 3A, 3B:
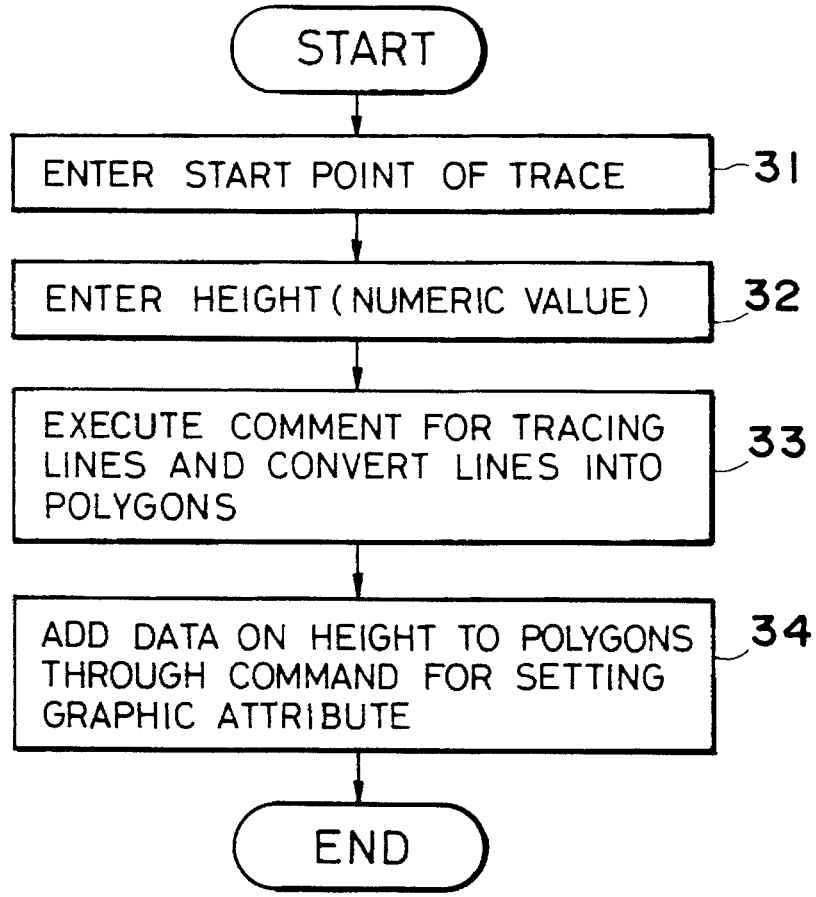
FIG. 3A is a diagram showing a coding sequence and FIG. 3B is a flowchart showing an example of coding the sequence of macro instructions of the command CONTOUR through a macro language and describing a flow of the processing.

As shown in FIG. 3A, the command CONTOUR consists of a sequence of macro instructions composed of two INPUT statements and two CALL statements. A description will now be made of the sequence of the macro instructions by following the flowchart as shown in FIG. 3B.

First, at step 31, the starting point of trace is entered, so that the macro instruction 'INPUT "STARTING POINT?", SP' is executed and a coordinates value of the starting point of the trace is fetched in the variable SP. Then, at step 32, a height (a numeric value) to be added to the data of the polygonal lines is entered as data of attributes. Hence, the macro instruction 'INPUT "HEIGHT", HEIGHT' is executed, and the data on the height is entered into the variable HEIGHT. Further, at step 33, a command for tracing lines is executed to convert the lines into the polygonal lines. At this end, a macro instruction 'CALL TRACE (1, SP,)' is executed, thereby transferring the processing control to the trace processing by the command for tracing the lines and tracing the contour lines to convert them into polygonal lines. Then, at step 34, a command for setting the attribute of the graphic is executed, thereby adding the data of the attributes about information on the height to the data of the polygonal lines. For this purpose, a macro instruction 'CALL FIGATT (5, "CONT", HEIGHT)' is executed.

Furthermore, a description will be made of an example of coding a command by making use of the high-level language interface library in the interactive CAD system according to the present invention. This example of the command is prepared by combining the processing functions for reversing black and white data of the image within a specified rectangular region into the opposite colors with the functions of the library registered within the high-level language interface library. The command prepared by coding the combination of the functions may be registered, for example, as the name of a command "RREVRSE".

Figure 4:
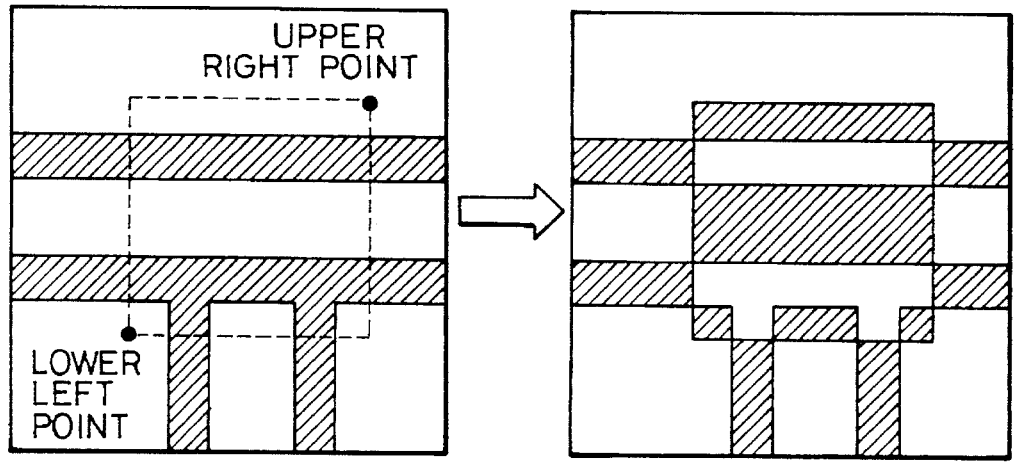
FIG. 4 is a diagram showing the processing function of a command RREVRSE.
Figure 5:
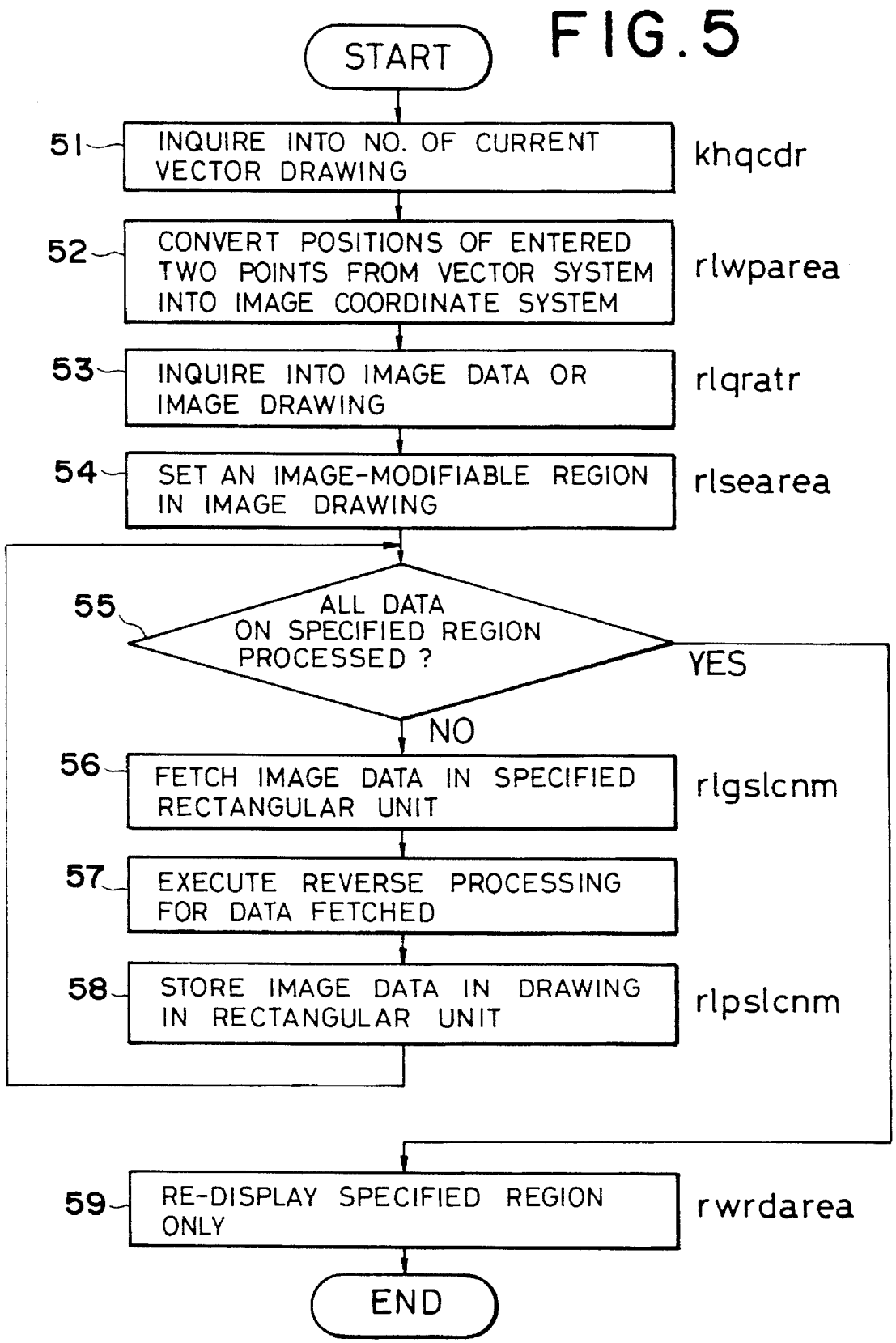
FIG. 5 is a flowchart showing an example of the processing flow through the command RREVRSE.

FIG. 4 describes the processing function of the command RREVRSE, and FIG. 5 is the flowchart indicating an example of the processing flow by the command RREVRSE. The command RREVRSE is so arranged as to enter, for example, a lower left point and an upper right point, as parameters, for specifying a region in which the black and white data of the image is reversed into the data of the image in the opposite colors. It is to be noted herein that the flowchart as shown in FIG. 5 indicates the names of functions to be employed in the processing blocks on the right-hand sides corresponding to the processing blocks in each step.

In the processing of the command, the functions of the library for operating the vector graphic and the data of the image are employed in combination, in order to reverse the image drawing within the specified region. A description will now be made of the names of the functions to be employed in each of the processing steps and the processing of the functions.

Function "khqcdr" (step 51): To give a number of the vector drawing currently loaded.

Function "rlwparea" (step 52): To convert entered two points into coordinates of an image drawing system.

Function "rlqratr" (step 53): To inquire about information on an image of the image drawing connected to the vector drawing currently loaded.

Function "rlsearea" (step 54): To define a region to be modifiable by data of the image.

Function "rlgslcnm" (step 56): To fetch data of the image in a rectangular unit.

Function "rlpslcnm" (step 58): To store data of the image in an image drawing in a rectangular unit.

Function "rwrdarea" (step 59): To re-display data of the image in a specified region.

In the reverse processing, first, at step 51, an inquiry is made about the number of the currently loaded vector drawing through the function 'khqcdr', followed by proceeding to step 52 at which the two points entered are converted from the vector system into the image coordinates system through the function 'rlwparea'. Then, at step 53, an inquiry is made about information of images on an image screen through the function 'rlqratr', followed by proceeding to step 54 at which an image-modifiable region is set within the image drawing by making use of the function 'rlsearea'. Then, at step 55, a decision is made to determine if data within the specified region has all been processed. If it is decided that not all the data has yet been processed, then the program flow goes to step 56 at which the data of the image is fetched out in a rectangular unit through the function 'rlgslcnm'. Then, at step 57, the data is reversed, followed by proceeding to step 58 at which the data of the image is stored in the image drawing in a rectangular unit by taking advantage of the function 'rlpslcnm' and, then, returning to step 55 for repeating the processing from step 55. On the other hand, when the result of decision at step 55 indicates that all the data has been processed, then the program flow goes to step 59 at which the data of the image existing in the specified region only is re-displayed through the function 'rwrdarea'.

By determining which vector drawing to be loaded by making use of the processing function of each of the functions in the manner as described hereinabove, information on the image drawing connected to the vector drawing can be fetched one after another and edited.

Further, the interactive CAD system according to an embodiment of the present invention allows the data of the image to be drawn readily with an interface in the same manner as in drawing the vector drawing, by calling a function of the library after the processing of the vector drawing and converting the vector drawing into the data of the image. A description will now be made of an example of the command in this case. This command may be a command for the processing function for drawing an image along the vector drawing specified, and it can readily be formed by combining the functions of the library registered in the high-level language interface library. The command prepared by coding the combination of the commands may be registered, for example, as the name of a command "FIG2RAS".

Figure 6:
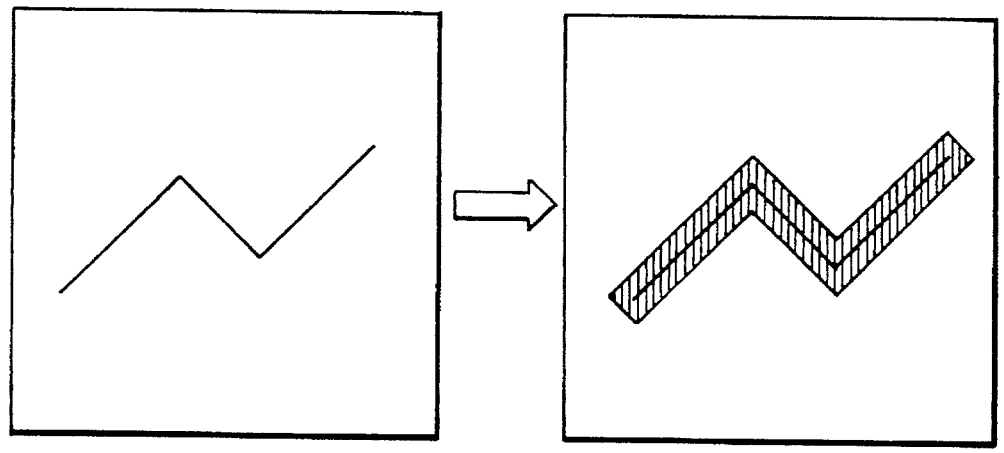
FIG. 6 is a diagram showing the processing function of a command FIG2RAS.
Figure 7:
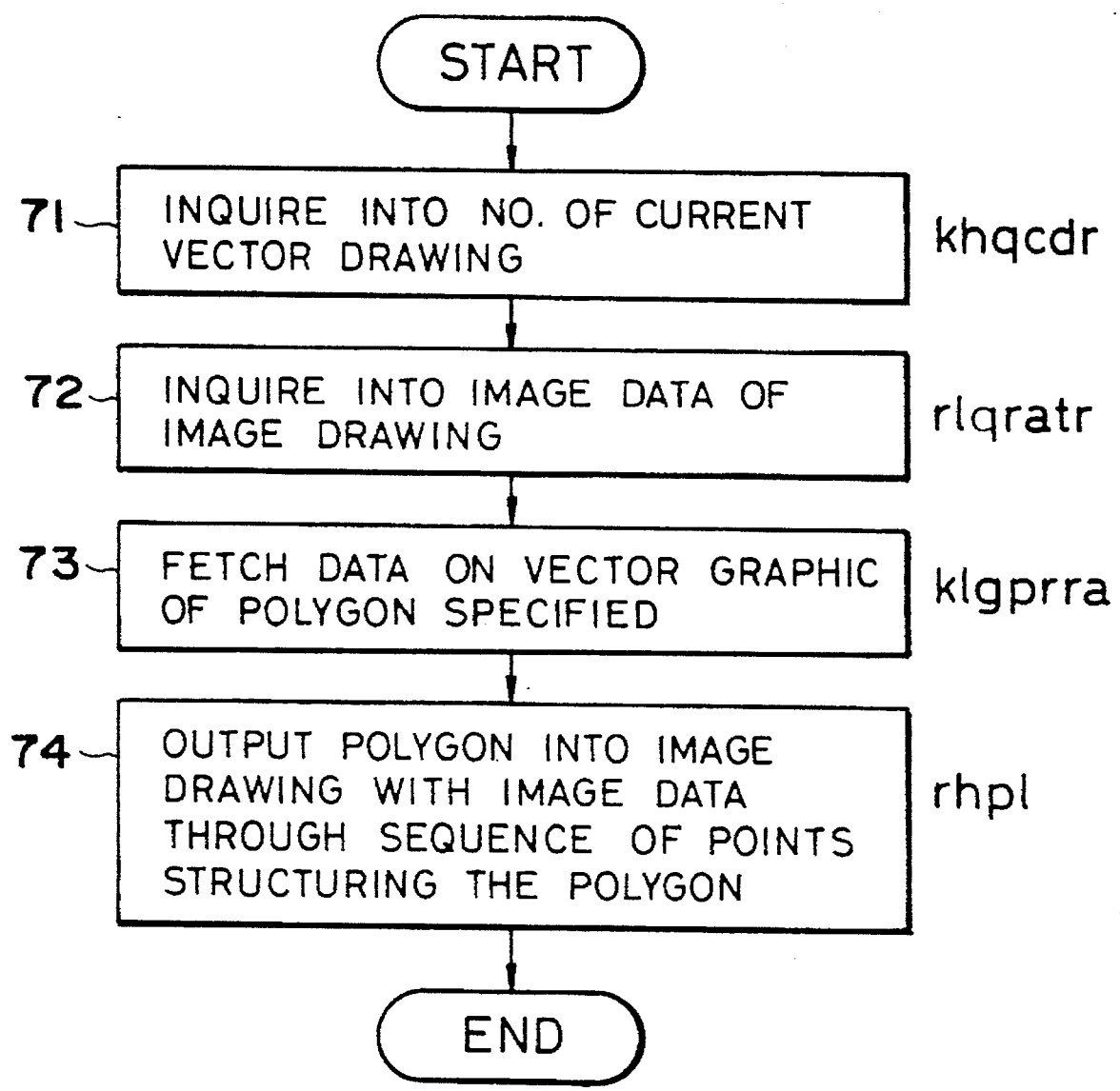
FIG. 7 is a flowchart showing an example of the processing flow through the command FIG2RAS.

FIG. 6 describes the processing function of the command FIG2RAS, and FIG. 7 is the flowchart indicating an example of the processing flow by the command FIG2RAS. The command FIG2RAS requires for the input for specifying the polygon as the object of processing, as a parameter, in order to draw the image along the specified vector drawing. The flowchart as shown in FIG. 7 is provided with the names of the functions to be employed in the processing blocks on the right sides corresponding to the processing blocks in each of the processing steps.

A description will now be made of the processing functions to be employed in each of the steps for the processing for drawing the data of the image from the data of the polygonal lines.

Function "khqcdr" (step 71): To give the number of the vector drawing currently loaded.

Function "rlqratr" (step 72): To inquire about information on an image of the image drawing connected to the vector drawing currently loaded.

Function "klgprra" (step 73): To give the data of the vector graphic of a specified polygonal line.

Function "rhpl" (step 74): To output the polygonal line into the image drawing as data of the image by delivering a sequence of points structuring the polygonal line.

In the processing for drawing the data of the image, an inquiry is first made about the number of the vector drawing currently loaded by making use of the function 'khqcdr' at step 71. Then, at step 72, an inquiry is made about the information on the image of the image drawing through the function 'rlqratr', followed by proceeding to step 73 at which the data of the vector graphic of the polygonal line specified is fetched out through the function 'klgprra'. Then, at step 74, the polygonal line is generated into the image drawing as the data of the image by specifying the polygonal line and converting the polygonal line into the data of the image. This processing is implemented through the function 'rhpl' by writing the polygonal line as the data of the image by delivering the sequence of the points structuring the polygonal line and, then, by generating the data of the image into the image drawing.

As have been described hereinabove, the data of the image can readily be drawn with substantially the same interface as in drawing the vector drawing. It should be noted, however, that, although the foregoing description is directed to the polygonal lines only, the data of the image of a circle, an arc, an oval, an elliptical arc, a sequence of characters, a curvature and the like, other than the polygonal lines, can be drawn on the image drawing by calling another function with the same interface as in writing the vector drawing.

As an alternative example of performing the graphic processing by using both of the data of the vector graphic and the data of the image, the data of the vector graphic may be drawn from the terminal points, intersecting points, and the like of the data of the image by collating the data of the image, in instances where the vector graphic is drawn to the contrary of the processing as described hereinabove. This graphic processing may convert the image drawing into the data of the vector graphic, for example, by snapshotting a sequence of points to be entered on the vector drawing to the terminal points, the intersecting points, and the like, of the image of the image drawing displayed in such a manner as superimposed with the vector drawing, and then by drawing the polygonal lines.

A description will now be made of an example of a command prepared for this processing. This command is a command for providing the processing function for drawing the polygonal lines on the vector drawing, which have been drawn by snapshotting the input points to the points on the linear image of the image drawing. This command can also be formed readily in a combination of the functions of the library registered in the high-level language interface library. The command formed by coding the combination of the functions may be registered, for example, as the name of a command "PRLSNAP" in the command library.

Figure 8:
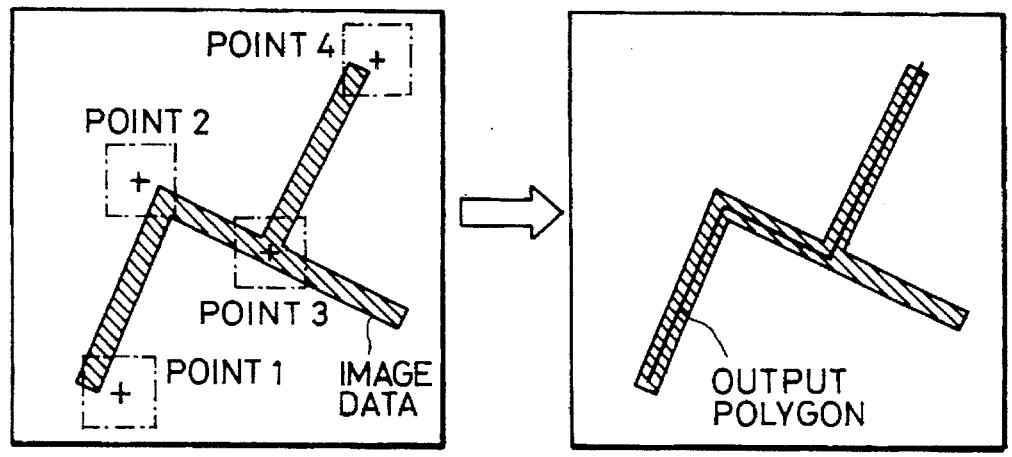
FIG. 8 is a diagram showing the processing function of a command PRLSNAP.

FIG. 8 describes the processing function of the command PRLSNAP, and FIG. 9 is the flowchart indicating an example of the processing flow by the command PRLSNAP. A parameter for the command PRLSNAP is a plurality of input points for drawing the data of the polygonal lines by snapshotting the specified input points on the linear image. The flowchart as shown in FIG. 9 is provided with the names of the functions to be employed in the processing blocks on the right sides corresponding to the processing blocks in each of the processing steps.

Then, a description will be made of the processing function of each of the functions to be employed in each of the processing steps for drawing the data of the image from the data of the polygonal lines.

Function "rirsnap" (step 91): To give coordinates obtained by snapshotting a specified point on the vector drawing currently loaded to a terminal point or an intersecting point of the data of the image of the image drawing connected to the vector drawing.

Function "khpl" (step 92): To write a polygonal graphic by delivering a sequence of the points structuring the polygonal lines.

In the drawing processing for drawing the data of the vector graphic (the data of the polygonal lines) from the data of the image, the input point specified is first converted through the function 'rirsnap' into coordinates to be snapshotted on the linear data of the image, at step 91. Then, at step 92, the polygonal lines connecting a sequence of coordinate points converted on the linear image are generated on the vector drawing. At this end, the processing for drawing the polygonal graphic is performed through the function 'khpl' by delivering a sequence of the points structuring the polygonal lines. The function for converting the coordinates of the point of the vector drawing into the coordinates, snapshotted on the characteristic points on the basis of the contents of the data of the image, can be employed for drawing the vector drawing along the image.

As have been described hereinabove, the interactive CAD system according to the present invention can offer the advantages as follows:

1. The command capable of treating both of the data of the vector graphic and the data of the image can be formed with ease by the user by programming a combination of the functions of the library provided by the system. Further, an amount of work for programming the commands can be reduced.

2. The user can form the command that satisfies the performance thoroughly equal to a system command without providing a command determined for an operation of the user as a system command.

3. As the function can be provided which can operate both of the data of the vector graphic and the data of the image to be treated by the system, each of the commands formed can be utilized in an effective way, for example, when a program for converting between the data of the vector graphic and the data of the image is formed.

What is claimed is:

1. A graphics processing system having an image memory for storing data of an image, a data memory for storing data of a vector graphic, a display unit for displaying the data of the image and the data of the vector graphic, and an input device for providing an instruction to edit the vector graphic and the image, wherein the data of the image and the data of the vector graphic are displayed in a superimposed way, operated, and edited, comprising: a library in which a command having a function for processing including each of operations of the vector graphic and the image is registered; wherein a series of the processing for operating and editing the data of the vector graphic and the data of the image is performed by executing the command registered in the library.

2. A graphics processing system as claimed in claim 1, wherein said library has basic commands each having a function of operating and editing the data of the vector graphic and the data of the image; and wherein a user's own command for operating and editing the data of the vector graphic and the data of the image can be registered in said library as a sequence of commands formed by combining said basic commands.

3. A graphics processing system as claimed in claim 2, wherein said library further has a macro language library in which a function is registered which has a function for setting information on the data of the vector graphic and the data of the image and a function for inquiring there-about is registered; and wherein a user's own command for operating and editing the data of the vector graphic and the data of the image through a sequence of commands in a combination of said basic commands with the function of the macro language library can be registered in said library.

4. A graphics processing system as claimed in claim 3, wherein said library further has a high-level language interface library in which a function of a functional program for operating and editing the data of the vector graphic and the data of the image is registered; wherein a processing function containing both of a function for processing the data of the vector graphic and a function for processing the data of the image is configured as a program in which the functions of the high-level language interface library are combined; and wherein the program is registered in said library as a user's own command.

5. A graphics processing system having an image memory for storing data of an image, a data memory for storing data of a vector graphic, a display unit for displaying the data of the image and the data of the vector graphic, and an input device for providing an instruction to edit the vector graphic and the image, wherein the data of the image and the data of the vector graphic are displayed in a superimposed way, operated, and edited, comprising: a library in which a basic command for operating and editing each of the data of the vector graphic and the data of the image is registered; wherein a combination of a plurality of the basic commands within the library is registered as a sequence of commands for performing the processing for treating the data of the vector graphic and the data of the image simultaneously; and wherein both of the data of the vector graphic and the data of the image are processed in a combined way through the sequence of the commands registered.

* * * * *